United States Patent
Saad et al.

(10) Patent No.: US 10,648,374 B2
(45) Date of Patent: May 12, 2020

(54) CAM PHASING SYSTEM ARCHITECTURE

(71) Applicant: CUMMINS INC., Columbus, IN (US)

(72) Inventors: Philipe F. Saad, Columbus, IN (US); Edward J. Lyford-Pike, Columbus, IN (US); Milan K. Visaria, Pune (IN); Agneya Turlapati, Indianapolis, IN (US); Anamitra Bhattacharyya, Greenwood, IN (US); Jason R. Griffin, Greenwood, IN (US); Brendan C. Norton, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 15/746,137

(22) PCT Filed: Aug. 11, 2016

(86) PCT No.: PCT/US2016/466007
§ 371 (c)(1),
(2) Date: Jan. 19, 2018

(87) PCT Pub. No.: WO2017/027732
PCT Pub. Date: Feb. 16, 2017

(65) Prior Publication Data
US 2018/0223702 A1    Aug. 9, 2018

Related U.S. Application Data
(60) Provisional application No. 62/204,244, filed on Aug. 12, 2015.

(51) Int. Cl.
*F01L 1/34*    (2006.01)
*F01L 1/344*    (2006.01)
(Continued)

(52) U.S. Cl.
CPC ............... *F01L 1/344* (2013.01); *F01L 1/026* (2013.01); *F02B 29/0412* (2013.01);
(Continued)

(58) Field of Classification Search
CPC ..... F01L 1/026; F01L 1/344; F01L 2001/054; F01L 2001/34486
(Continued)

(56) References Cited

U.S. PATENT DOCUMENTS 8,495,981 B2 *   7/2013   Stewart ..................... F01L 1/34
                                                              123/179.4
2006/0027208 A1   2/2006   Pinkston
(Continued)

FOREIGN PATENT DOCUMENTS

AT           4386 U1    6/2001
DE      19843588 A1    3/2000
(Continued)

OTHER PUBLICATIONS

International Search Report and Written Opinion dated Oct. 31, 2016 in corresponding International Application No. PCT/US2016/046607.
(Continued)

*Primary Examiner* — Ching Chang
(74) *Attorney, Agent, or Firm* — Faegre Drinker Biddle & Reath LLP

(57) ABSTRACT

A spark-ignited gas engine system comprises a combustion chamber defined by a piston, a head with a spark plug mechanism, and a cylinder having an associated intake valve and an associated exhaust valve, into which a mixture of combustible gas and air is entered via an intake manifold of the engine to drive a crankshaft. The system further comprises at least one turbocharger to compress the mixture. The system further comprises at least one camshaft, driven by the
(Continued)

crankshaft via a gear assembly connected to the crankshaft, that comprises at least one cam that actuates the intake valve and the exhaust valve, at least one camphaser, coupled to the crankshaft via the gear assembly, and a controller to adjust a cam angle operation of the intake valve and the exhaust valve by adjusting the camphaser to a desired phase position to meet a target rotational phase of the camshaft.

14 Claims, 11 Drawing Sheets

(51) Int. Cl.
| | | |
|---|---|---|
| *F02B 29/04* | (2006.01) | |
| *F02D 13/02* | (2006.01) | |
| *F02D 19/02* | (2006.01) | |
| *G06F 13/00* | (2006.01) | |
| *F01L 1/02* | (2006.01) | |
| *F01L 1/14* | (2006.01) | |
| *F01L 1/047* | (2006.01) | |

(52) U.S. Cl.
CPC ......... *F02D 13/02* (2013.01); *F02D 13/0219* (2013.01); *F02D 19/02* (2013.01); *G06F 13/00* (2013.01); *F01L 1/146* (2013.01); *F01L 2001/054* (2013.01); *F01L 2001/34486* (2013.01); *F01L 2250/04* (2013.01); *F01L 2820/041* (2013.01); *Y02T 10/146* (2013.01); *Y02T 10/18* (2013.01); *Y02T 10/32* (2013.01)

(58) Field of Classification Search
USPC .......................................... 123/90.15, 90.17
See application file for complete search history.

(56) References Cited

U.S. PATENT DOCUMENTS

| | | |
|---|---|---|
| 2009/0216428 A1 | 8/2009 | Ramappan et al. |
| 2012/0053817 A1 | 3/2012 | Gauthier et al. |
| 2012/0247411 A1 | 10/2012 | Stewart et al. |
| 2012/0318223 A1 | 12/2012 | Stewart et al. |
| 2014/0083220 A1 | 3/2014 | Mukohara et al. |
| 2014/0224200 A1 | 8/2014 | Luft et al. |

FOREIGN PATENT DOCUMENTS

| | | |
|---|---|---|
| DE | 102013221886 A1 | 4/2015 |
| EP | 1614867 A1 | 1/2006 |

OTHER PUBLICATIONS

Supplemental Search Report issued by the European Patent Office, dated Apr. 29, 2019, for Application No. EP16835931; 8 pages.

* cited by examiner

CAM PHASING SYSTEM ARCHITECTURE

RELATED APPLICATIONS

The present application is a national phase filing under 35 U.S.C. § 371 of International Application No. PCT/US2016/046607 titled CAM PHASING SYSTEM ARCHITECTURE, filed on Aug. 11, 2016, which claims priority to U.S. Provisional Application Ser. No. 62/204,244, filed on Aug. 12, 2015, and titled CAM PHASING SYSTEM ARCHITECTURE, the entire disclosures of which being expressly incorporated herein by reference.

FIELD OF THE INVENTION

The present disclosure relates generally to spark-ignited gas engines, and, more specifically, to spark-ignited gas engine systems including a camphaser.

BACKGROUND OF THE INVENTION

Spark-ignited gas engines use higher brake mean effective pressure (BMEP) to meet the need of higher thermal efficiency, higher power density, and lower emissions. Often, to meet these targets, larger and more efficient turbochargers are necessary. Such turbochargers, which may be in single stage or two stage configurations, are one reason today's engines sometimes struggle with transient response. Accordingly, it is desirable to control a spark-ignited combustible gas engine system, particularly during transient events, capable of responding appropriately to transient operating conditions.

SUMMARY

The present disclosure may comprise one or more of the features recited in the attached claims, and/or one or more of the following features and combinations thereof. A spark-ignited gas engine system may comprise a combustion chamber defined by a piston, a head with a spark plug mechanism, such as a spark plug in an open chamber or a pre-chamber configuration, and a cylinder having an associated intake valve and an associated exhaust valve in at least one of an inline and V configurations, into which a mixture of combustible gas and air is entered via an intake manifold of the engine to drive a crankshaft. The spark-ignited gas engine system may further comprise at least one turbocharger having a turbine fluidly coupled to an exhaust manifold of the engine via an exhaust conduit and a compressor fluidly coupled to the intake manifold of the engine via a mixture passageway. Optionally, the compressor may be fluidly coupled to at least one stage of a charge air cooler and at least one throttle connected to the intake manifold of the engine via the mixture passageway. The turbine may be rotatably connected to the compressor via a rotatable shaft such that the turbine rotatably drives the compressor via the rotatable shaft in response to exhaust gas passing through the turbine to compress the mixture. The spark-ignited gas engine system may further comprise at least one camshaft, driven by the crankshaft via a gear assembly connected to the crankshaft, where the camshaft comprises at least one cam that actuates the intake valve, the exhaust valve, or both. The spark-ignited gas engine system may further comprise a camphaser coupled to the crankshaft via the gear assembly. The spark-ignited gas engine system may further comprise a controller including a memory having instructions stored therein that are executable by the controller to adjust a cam angle operation of the intake valve and the exhaust valve by adjusting the camphaser to a desired phase position to meet a target rotational phase of the camshaft.

Alternatively, or in addition, the instructions stored in the memory may further include instructions that are executable by the controller to adjust the camphaser based on at least one of an actual crankshaft position, an actual cam position, an actual engine load, and an actual engine speed signal.

Alternatively, or in addition, the memory may have stored therein a look up table that tabulates at least one of a crankshaft position and an engine load against a desired cam position value. The instructions stored in the memory may include instructions that are executable by the controller to compare the actual cam position with the desired cam position value and adjust the camphaser to the desired phase position based on the comparison.

Alternatively, or in addition, the gear assembly may comprise a crankshaft gear associated with the crankshaft. The crankshaft gear may be indirectly engaged with the camphaser via an idler gear that is directly engaged with both the crankshaft gear and a compound gear associated with the camphaser. The compound gear may be directly engaged with a camshaft gear associated with the camshaft.

Alternatively, or in addition, a crankshaft gear that is associated with the crankshaft may be directly engaged with the camphaser.

Alternatively, or in addition, the gear assembly may comprise a compound gear associated with the camphaser. The compound gear may be directly engaged with a camshaft gear associated with the camshaft. Alternatively, the compound gear may be indirectly engaged with a camshaft gear associated with the camshaft via an idler gear that is directly engaged with both the camshaft gear and the compound gear.

Alternatively, or in addition, the controller may be configured to adjust the cam angle operation of the intake valve and the exhaust valve simultaneously.

In one embodiment, a compound gear may be directly engaged with a first camshaft gear and an idler gear. The idler gear may be directly engaged with a second camshaft gear. The compound gear may also be directly engaged with a crank gear. For example, when the crankshaft rotates, the compound gear rotates, thus causing both the first and second camshafts to rotate simultaneously. In one embodiment the compound gear is associated with a camphaser, where the controller may be configured to adjust the camphaser. For example, by adjusting the camphaser, a cam angle operation of an intake valve and an exhaust valve of both camshafts may be adjusted simultaneously to a desired phase position to meet a target rotational phase of the camshafts relative to the crankshaft. It is also contemplated that the compound gear may engage additional camshaft gears either directly or indirectly via, for example, additional idler gears.

A method is illustratively provided for controlling a spark-ignited gas engine system. The method may comprise adjusting a cam angle operation of an intake valve and an exhaust valve of the spark-ignited gas engine system by adjusting a camphaser to a desired phase position to meet a target rotational phase of the camshaft.

Alternatively, or in addition, adjusting the camphaser may be based on at least one of an actual crankshaft position signal, an actual cam position signal, an actual engine load signal, and an actual engine speed signal.

Alternatively, or in addition, the method may comprise comparing the actual cam position signal with a desired cam position value and adjusting the camphaser to the desired phase position based on the comparison.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
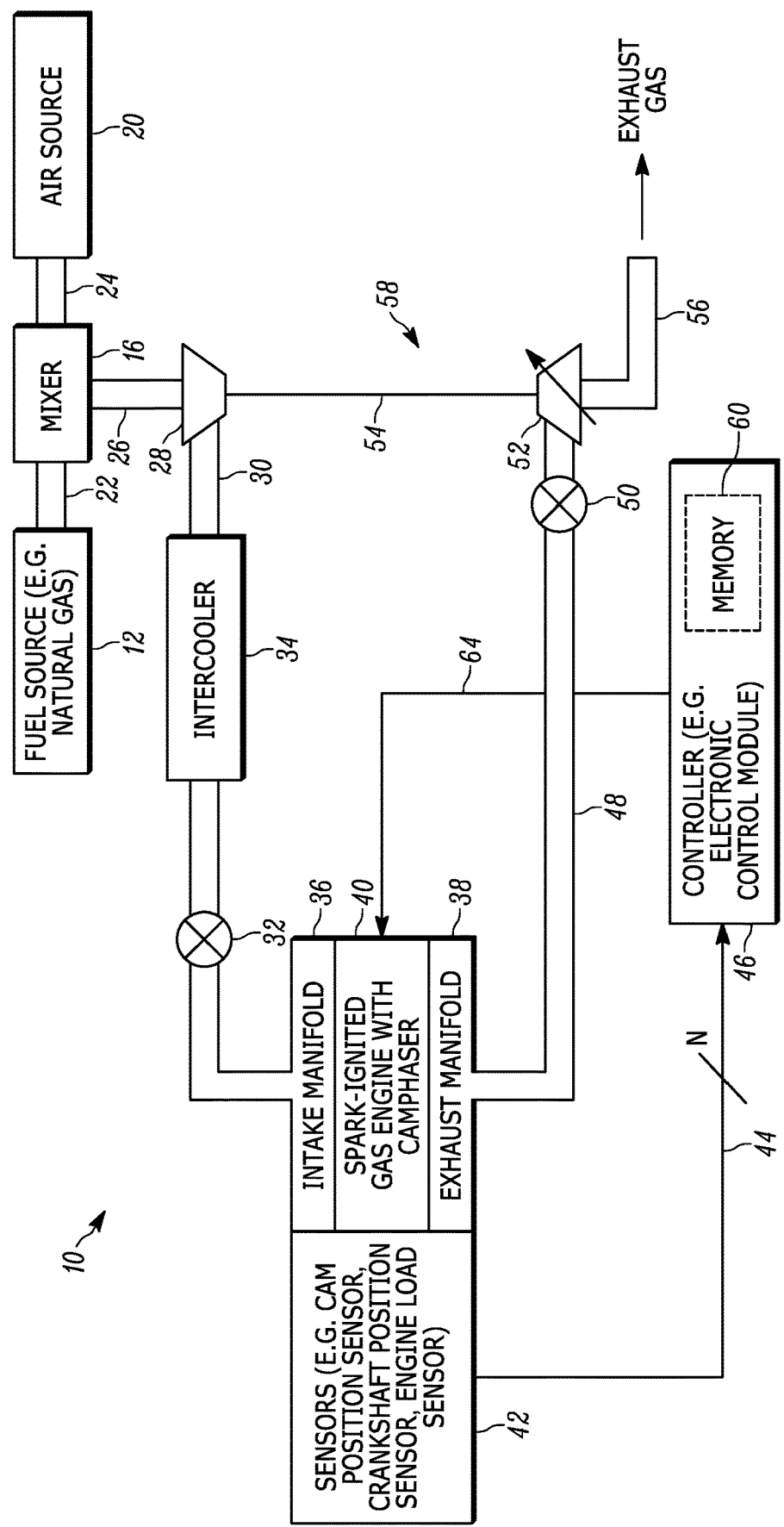
FIG. 1 is a block diagram of one illustrative embodiment of a spark-ignited engine system having a camphaser.

Referring now to FIG. 1, a block diagram is shown of one illustrative embodiment of a system 10 for a spark-ignited gas engine 40 having a camphaser. In the illustrated embodiment, system 10 includes air line 24 and fuel line 22 which are in fluid communication with air/fuel mixer 16. The air line 24 may receive air from an air source 20, which in one embodiment is a supply of fresh air. In other embodiments, air line 24 may include an air filter (not shown) that filters air supplied to the mixer 16. The fuel line 22 may receive fuel from a fuel source 12, which in one embodiment is a supply of natural gas. In other embodiments, a different form of fuel could be used. System 10 may also be adapted for fueling with gasoline, diesel fuel, or another fuel type as would occur to those skilled in the art.

Figure 2:
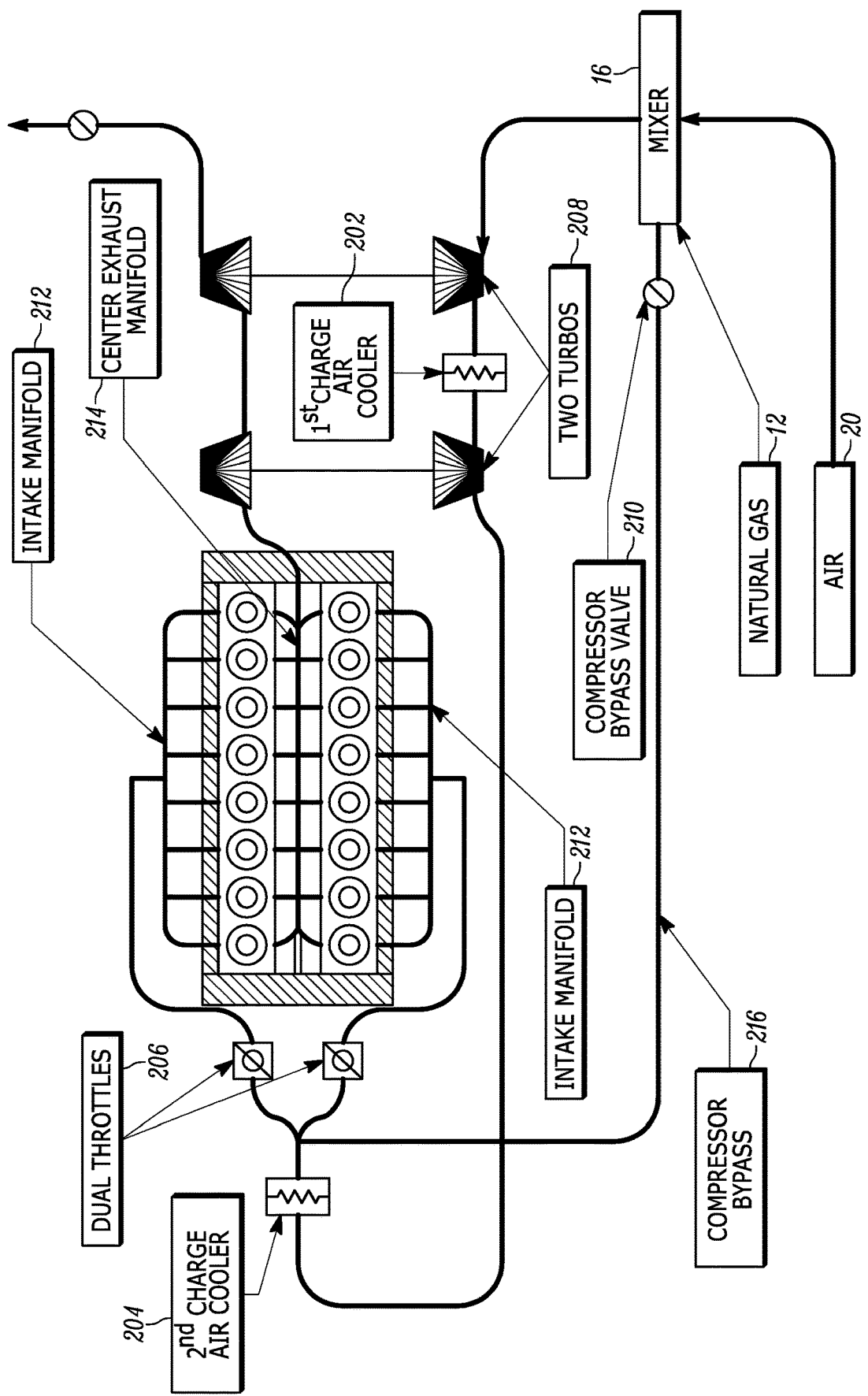
FIG. 2 is a block diagram of one illustrative embodiment of a spark-ignited engine system having cylinders positioned in a V configuration.

The air/fuel mixture is passed to compressor 28 of a turbocharger 58, which may be of the variable geometry variety and is in fluid communication with mixer 16 over passage 26. Compressor 28 generally increases pressure of the mixture flowing therethrough, thereby generating a pressurized mixture to flow along a mixture passageway 30. Compressor 28 may be of a turbocharger configuration known in the art. Although a single stage turbocharger configuration is shown, other configurations are contemplated, such as two stage and twin turbo, that are connected in a series and/or parallel manner within the system 10 as known in the art. An example of a two stage turbocharger system is shown in FIG. 2.

The pressurized mixture flows along the mixture passageway 30 from compressor 28 to throttle valve 32, which regulates flow of the pressurized mixture therethrough. Throttle valve 32 may be a standard butterfly-type of valve, configured for rotary actuation. Throttle valve 32 may be actuated in response to a signal (not shown) from controller 46. The pressurized mixture flows from throttle valve 32 to the intake manifold 36. Optionally, a charge air cooler 34 may be disposed in-line with the mixture passageway 30, as is known in the art, to cool the mixture supplied by the compressor 28 to the intake manifold 36 in a conventional manner. The charge air cooler 34 may be disposed either upstream or downstream of the throttle valve 32. Although a single throttle system is depicted, the system may be adapted for a dual throttle system, where a dual throttle configuration is used to allow the pressurized mixture to flow from the charge air cooler 34 to the intake manifold 36. An example of a dual throttle system is shown in FIG. 2.

A turbine 52 of the turbocharger 58 has an inlet fluidly coupled to an exhaust manifold 38 of the spark-ignited gas engine 40 having a camphaser via an exhaust conduit 48, and an outlet fluidly coupled via an exhaust gas passageway 56. The turbine 52 is illustratively a conventional variable geometry turbocharger having a variable swallowing capacity that may be selectively controlled as indicated by the diagonal arrow passing through the turbine 52 in FIG. 1. In other embodiments, the turbine 52 may be associated with turbochargers of variable or fixed geometry types. In any case, exhaust gas produced by the spark-ignited gas engine 40 having a camphaser passes through the exhaust conduit 48 to the inlet of the turbine 52, and then passes through the outlet of the turbine 52 to an ambient environment via the exhaust gas passageway 56 in a conventional manner.

Figure 3:
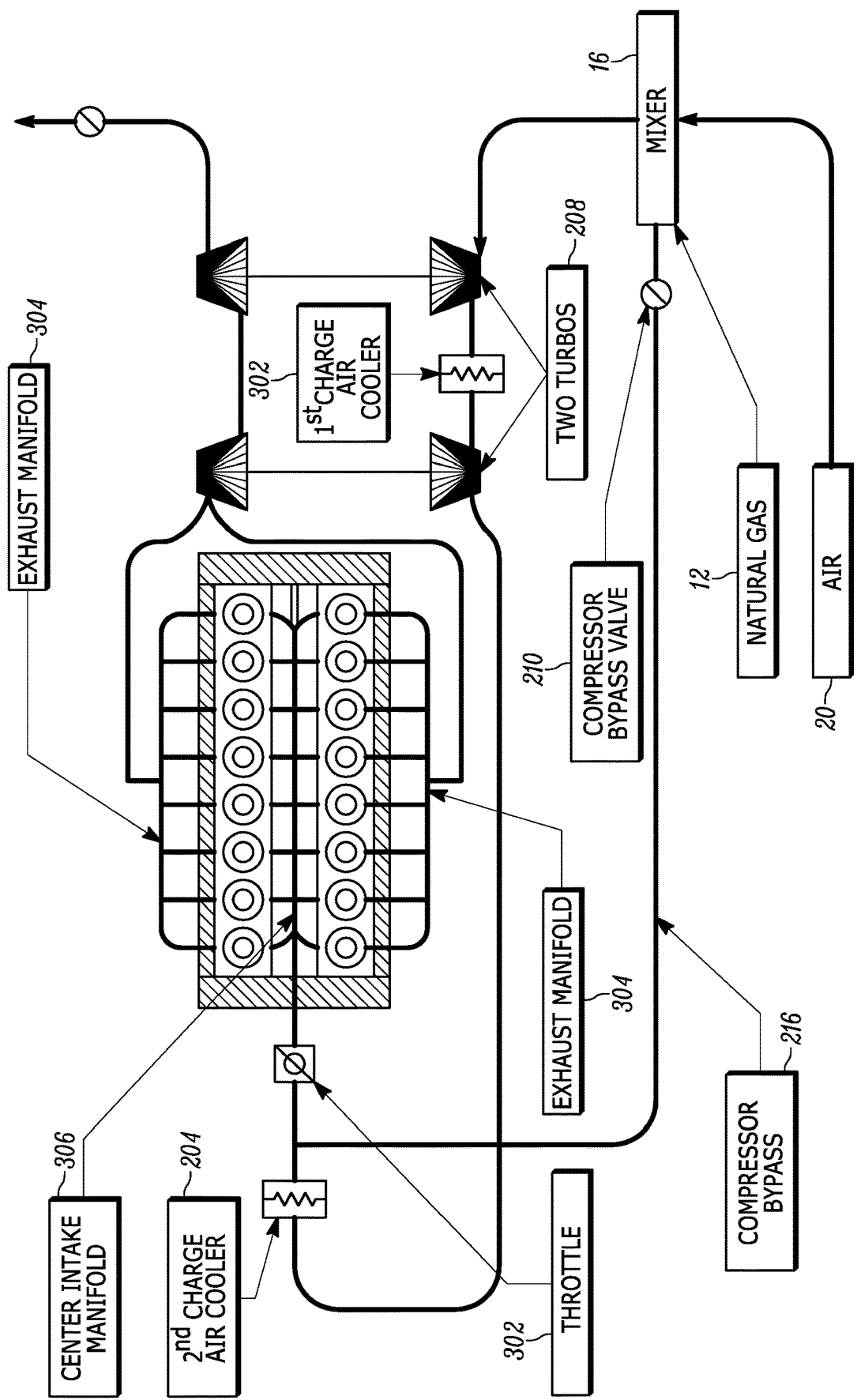
FIG. 3 is a block diagram of another illustrative embodiment of a spark-ignited engine system having cylinders positioned in a V configuration.

The compressor 28 of the variable geometry turbocharger 58 includes a compressor wheel or disk (not shown) and the turbine 52 likewise includes a wheel or disk (not shown), and the wheel or disk of the compressor 28 is rotatably coupled to the wheel or disk of the turbine 52 via a rotatable shaft 54. Exhaust gas flowing through the turbine 52 causes the wheel or disk of the turbine 52 to rotate, thereby causing the shaft 54, and thus the wheel or disk of the compressor 28, to also rotate. Rotation of the wheel or disk of the compressor 28 draws additional air/fuel mixture into compressor 28 through conduit 26, thereby increasing the flow rate of the air/fuel mixture into the intake manifold 36 above what it would otherwise be without the turbocharger 58. In some embodiments, the system 10 may additionally include a turbine bypass valve 50 fluidly coupled between the exhaust conduit 48 and exhaust gas passageway 56 for the purpose of selectively diverting exhaust gas around the turbine 52 to thereby modulate the energy applied to the turbine 52. In some embodiments, the system 10 may additionally include a compressor bypass valve as depicted in FIGS. 2 and 3.

In the illustrated embodiment, the system 10 further includes a controller 46 including a memory 60 having instructions stored therein that are executable by the controller 46 to control operation of at least the system 10, including operation of the spark-ignited gas engine 40 having a camphaser. The controller 46 illustratively includes a conventional processor, e.g., a microprocessor, which may be programmed as illustrated and described herein to control operation of the system 10 as also described herein. The controller 46 has a number, N, of inputs for receiving signals from N corresponding sensors 42 associated with the system 10 via N corresponding signal paths 44. The memory 60 further includes instructions stored therein that are executable by the controller 46 to process the sensor signals produced by the N sensors 42 to determine corresponding system and/or engine operating parameters. Examples of such sensors 42 may include a cam position sensor, a crank position sensor, an engine load sensor, and an engine speed sensor as described further below.

By configuring a camphaser within the system 10, it is possible to adjust the volumetric efficiency of the spark-ignited gas engine 40. For instance, during transient response, the controller 46 may adjust (i.e., advance or retard) a cam angle operation of either or both of an intake valve and an exhaust valve of the cylinders, individually or simultaneously, within the spark-ignited gas engine 40 by adjusting the camphaser to a desired phase position to meet a target rotational phase of the camshaft. For instance, the camphaser may be at a retarded position that will cause the volumetric efficiency of the spark-ignited gas engine 40 to increase, which in turn can cause the turbocharger 58 to initiate faster for a quicker transient response. Instead, the camphaser may be at an advanced position such that an exhaust valve, for instance, is open during much of a power stroke of the engine in order to bring down the power of the engine. For example, the controller may advance a cam angle at full loads to increase the degree of Miller cycling and maximize brake thermal efficiency (BTE), or retard the cam angle to improve lower load performance of the engine. Other benefits include a reduction in propensity for turbocharger surge time under cold operations conditions, an improvement in load acceptance and load rejection, and an improvement in engine BTE, altitude capability, and knock margin (e.g., reduction of in-cylinder knocking). Other benefits will be realized by those of ordinary skill in the art.

The spark-ignited gas engine 40 may include a plurality of combustion chambers and corresponding cylinders that each contribute power in accordance with a timed ignition operation. The engine 40 may be a conventional four-stroke, two-stroke, piston-based, rotor-based, or any other suitable engine. Engine sensors 42 may be placed on various components of the engine 40. For example, a crankshaft position sensor may be placed on a crankshaft to measure its position. A cam position sensor may be placed on a cam or camshaft to measure its position. Engine sensors 42 may provide signals to the controller 46 to control engine operation, such as activating spark plugs associated with each cylinder to ignite the engine 40 as known in the art. Controller 46 may be a programmable microprocessor-based integrated circuit controller provided in an electronic control module (ECM). In other embodiments, the controller 46 may be comprised of digital circuitry, analog circuitry, or a combination of both. Controller 46 may be a programmable digital or analog processor, a hardwired, dedicated state machine, or a combination of both. Controller 46 may be a single controller or may include more than one controller disposed to control various functions and/or features of the engine.

The cylinders of the spark-ignited gas engine 40 may be positioned in either an inline or V configuration. In the case of an inline configuration, both the intake manifold 36 and exhaust manifold 38 may be on either side of the cylinders. In the case of a V configuration, the exhaust manifold 38 may be located in the valley between the cylinders of each bank and the intake manifold 36 may be located on each side of the engine outside of the valley, as shown in FIG. 2. Alternatively, in the case of another V configuration, the intake manifold 36 may be located in the valley between the cylinders of each bank and the exhaust manifold 38 may be located on each side of the engine outside of the valley, as shown in FIG. 3.

FIGS. 2 and 3 illustrate examples of a spark-ignited engine system having cylinders positioned in a V configuration. The spark-ignited engine system of FIG. 2 includes dual throttles 206, two turbos (e.g., turbochargers) 208, a first charge air cooler 202, and a second charge air cooler 204. The dual throttles 206 are operably connected via a passageway to intake manifolds 212. As indicated in the figure, the example spark-ignited engine system includes a center exhaust manifold 214. The dual throttles 206 are operably coupled via a compressor bypass 216 to a compressor bypass valve 210. Although similar to the spark-ignited engine system of FIG. 2, the spark-ignited engine system of FIG. 3 includes a single throttle 302 operably coupled via a passageway to a center intake manifold 306 rather than the dual throttles 206 and intake manifolds 212 of FIG. 2. The spark-ignited engine system of FIG. 3 also includes exhaust manifolds 304, rather than the center exhaust manifold 214 of the spark-ignited engine system of FIG. 2.

Figure 4:
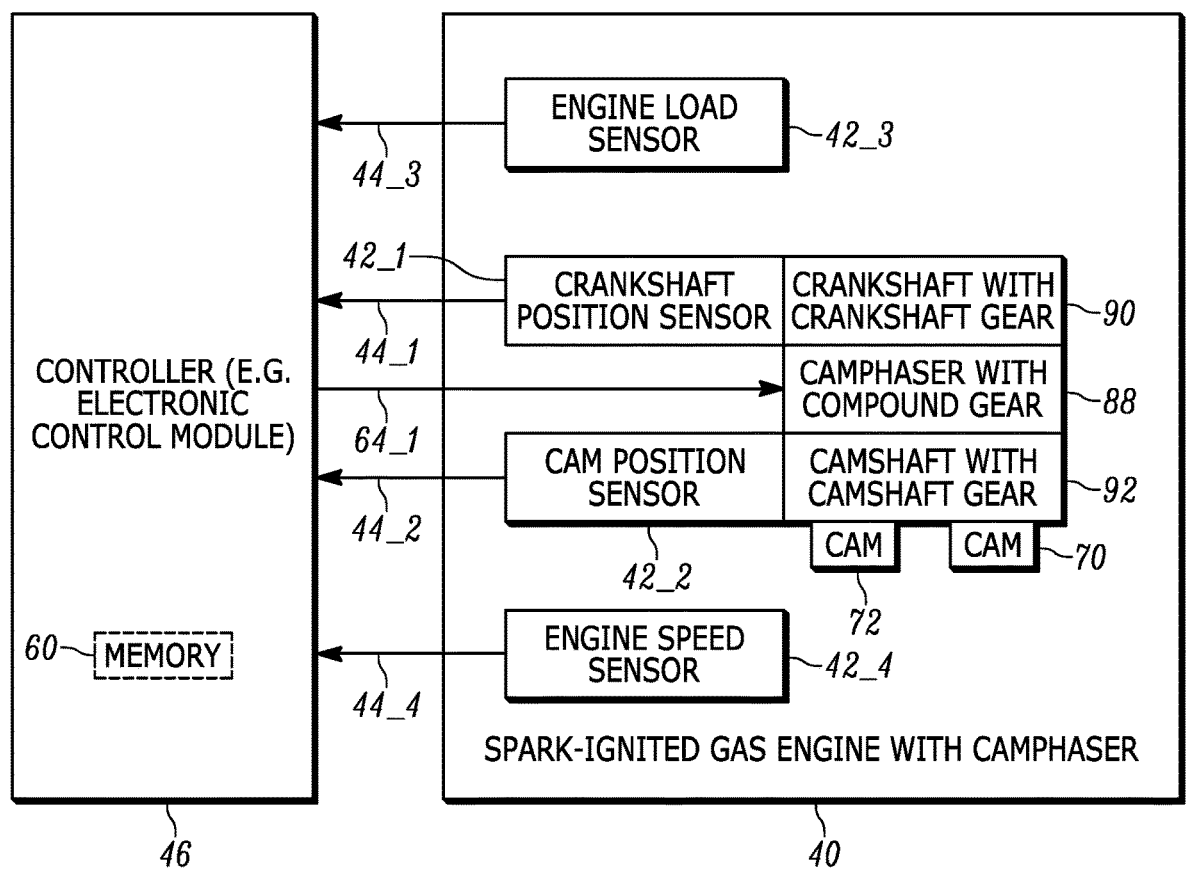
FIG. 4 is a block diagram of another illustrative embodiment of a spark-ignited engine system having a camphaser.

Referring to FIG. 4, the controller 46 is disposed to receive various inputs indicative of engine operating parameters. Specifically, the controller 46 receives a crankshaft position signal 44_1 from the crankshaft position sensor 42_1, a cam position signal 44_2 from a cam position sensor 42_2, an engine load signal 44_3, which may be expressed as a torque applied to the engine, from an engine load sensor 42_3, and an engine speed signal 44_4 from an engine speed sensor 42_4. The engine load signal 44_3 and engine speed signal 44_4 may be provided directly by the engine load sensor 42_3 and engine speed sensor 42_4, respectively, or may alternatively be calculated indirectly from other appropriate parameters indicative of the load and speed of the engine during operation, such as intake manifold pressure, exhaust pressure, engine oil or coolant temperature, and the like. The cam position signal 44_2 may be provided from cam position sensors associated with the intake and exhaust valves of the engine 40. The controller 46 includes various sub-modules as shown and described herein, but it should be appreciated that the functionality of the modules illustrated is not exhaustive. Various interfaces of the controller 46 are described relative to components of the engine 40. Such interfaces are not intended to limit the type and number of components that are connected, nor the number of controllers that are described.

A camshaft with camshaft gear 92 may be affixed with a cam, such as cam 70 and 72, which may have one or more lobes (not shown) affixed to the cam. The lobes may be arranged to engage the intake valve and the exhaust valve of the cylinder at various times within the spark-ignited gas engine 40. Cams such as cam 70 and 72 may include more than one cam lobe in various configurations depending upon the desired timing of the intake valve and exhaust valve of the cylinder. The cams may retard or advance the movement of both valves as known in the art. The camshaft gear associated with camshaft 92 may be either operatively or directly coupled to the camshaft to engage with other gears of the engine 40.

For instance, the associated camshaft gear may engage with a compound gear associated with a camphaser 88. The associated compound gear may either be operatively or directly coupled to the camphaser. As such, the camphaser is operable to adjust the rotational phase of the camshaft. The compound gear associated with a camphaser 88 may directly engage with a crankshaft gear associated with a crankshaft 90. In another embodiment, the compound gear associated with a camphaser 88 may indirectly engage with the crankshaft gear via an engaged idler gear. Accordingly, when the crankshaft rotates, the compound gear associated with a camphaser 88 rotates.

The controller 46 may transmit a camphaser phase adjustment position signal 64_1 to the camphaser 62 based on received crankshaft position signal 44_1, cam position signal 44_2, engine load signal 44_3, and engine speed signal 44_4 from the engine 40. Specifically, crankshaft position sensor 42_1 associated with the crankshaft with crankshaft gear 90 may transmit the crankshaft position signal 44_1, cam position sensor 42_2 associated with the camshaft with camshaft gear 92 may transmit the cam position signal 44_2, engine load sensor 42_3 may transmit the engine load signal 44_3, and engine speed sensor 42_4 may transmit the engine speed signal 44_4. As such, the controller may command the camphaser to adjust the rotational phase of the camshaft with camshaft gear 92. Subsequently, at least one of the cams (e.g., cam 70 and cam 72) may act as an overhead cam and control the opening and closing of the intake and exhaust valves of the cylinder. For instance, one cam may control both the opening and closing of the intake and exhaust valves. Other configurations may be used, such as a dedicated cam for each valve.

Figure 5:
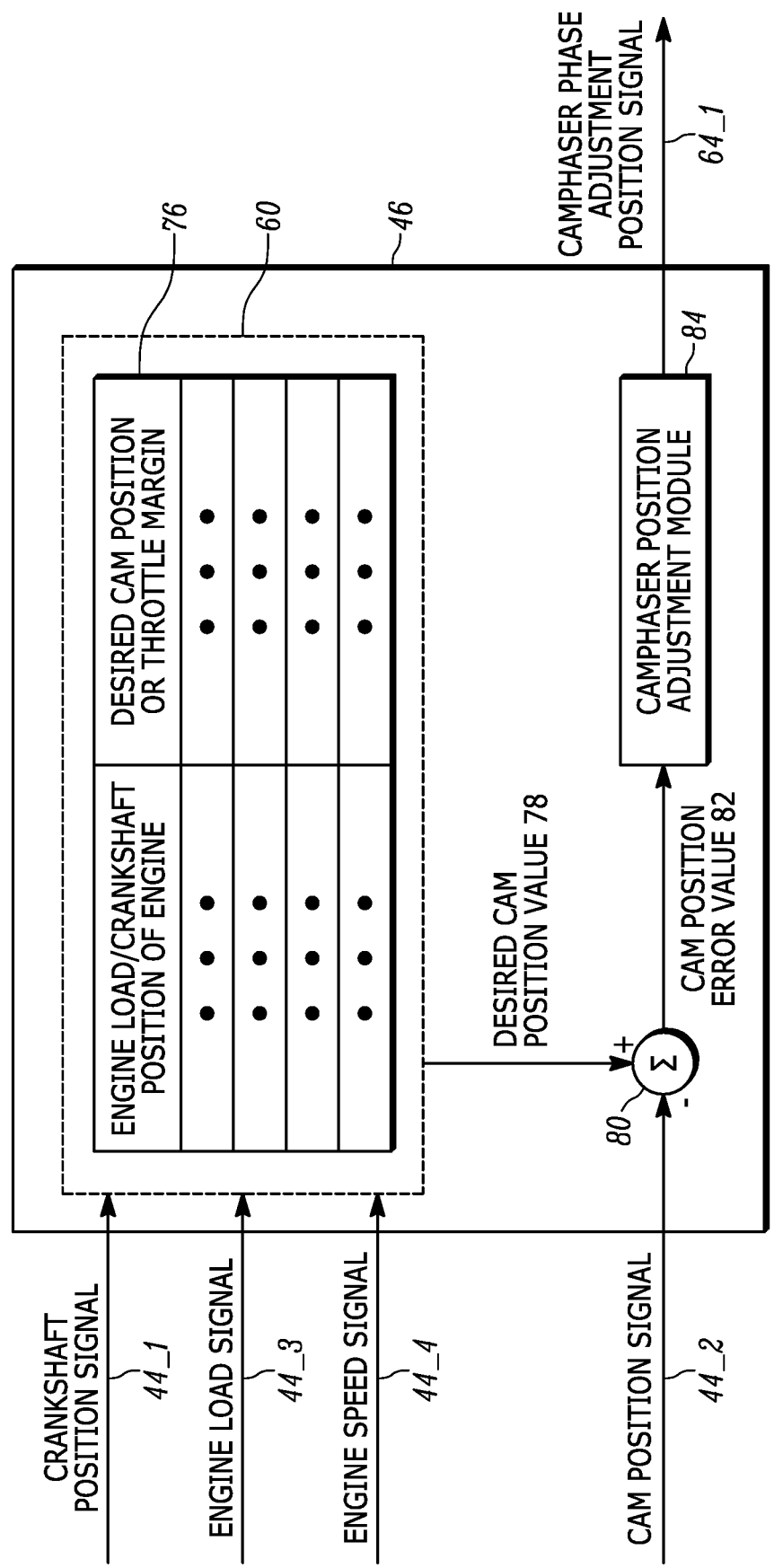
FIG. 5 is a block diagram of one illustrative embodiment of the controller illustrated in FIG. 4.

Referring to FIG. 5, the controller 46 includes a lookup table 76 stored in memory 60 that tabulates either the crankshaft position, the engine load, or both, against a desired cam position value 78, a desired throttle margin value, or both. As such, the controller 46 may be load-based, where the cam position depends on the load of the engine, or throttle margin-based, where the cam position is changed to target a specified throttle margin. The controller 46 receives the crankshaft position signal 44_1, the engine load signal 44_3, and the engine speed signal 44_4, which may represent the engine speed value in revolutions per minute, for example, during operation, and uses these signals to lookup, interpolate, or otherwise determine a desired cam position value 78 to meet a target rotational phase of a camshaft. For example, the controller 46 may determine the desired cam position value 78 based on a load of the engine, such as a current load. As another example, the controller 46 may determine the desired cam position value 78 based on a desired (e.g., target, specified) throttle margin. The desired cam position value 78 is compared to the actual cam position signal 44_2 at a summing junction 80 to provide a cam position error value 82. The cam position error value 82 is provided to a camphaser position adjustment module 84, which yields a camphaser phase adjustment position signal 64_1. The camphaser phase adjustment position signal 64_1 is then sent to the camphaser 62 to initiate a phase change. The camphaser position adjustment module 84 may be any suitable algorithm such as a proportional-integral-derivative (PID) controller or a variation thereof, a model based algorithm, a single or multidimensional function that maps cam position error values to a camphaser phase adjustment position value, and the like.

Other control configurations for the controller 46 are contemplated. For example, the controller 46 may comprise a closed-loop speed control mechanism as known in the art, where the cam position is changed to target a specified speed. For example, the controller 46 may determine the desired cam position value 78 based on a specified (e.g., indicated) speed.

Figure 6:
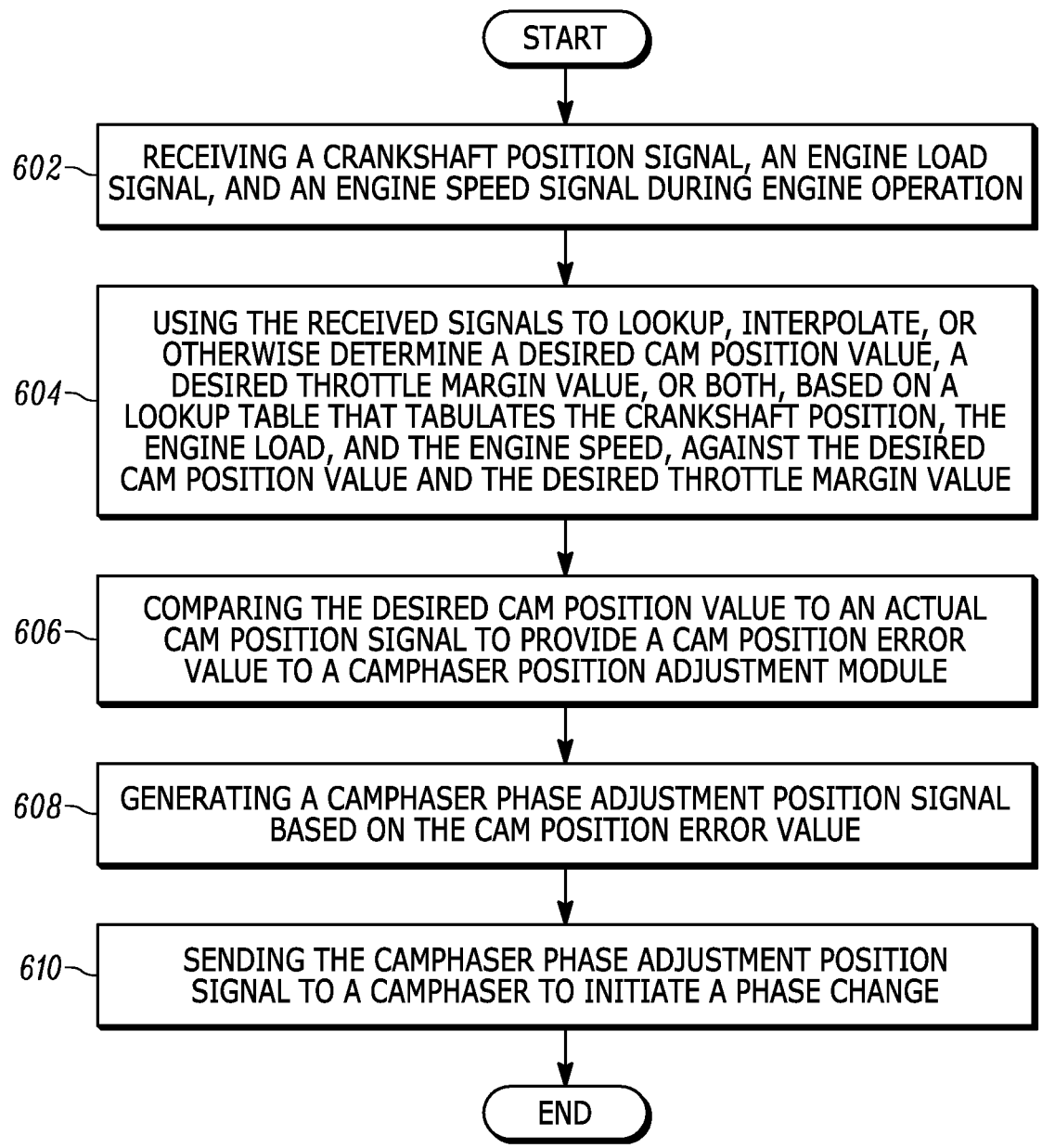
FIG. 6 is a flowchart illustrating one illustrative embodiment of a process executed by the controller illustrated in FIG. 5.

FIG. 6 illustrates a flowchart of one embodiment of a process that may be executed by, for example, the controller 46 of FIG. 5. At step 602, a crankshaft position signal, an engine load signal, and an engine speed signal are received during engine operation. At step 604, a desired cam position value, a desired throttle margin value, or both, are determined using the received signals based on a lookup table. The lookup table tabulates the crankshaft position, the engine load, and the engine speed against the desired cam position value and/or the desired throttle margin value.

For example, the engine load signal may indicate a current load of the engine. A controller may then determine the desired cam position value based on a desired cam position value in the lookup table corresponding to the current load of the engine. Similarly, the crankshaft position signal may indicate a current crankshaft position. The controller may then determine the desired cam position value based on a desired cam position value in the lookup table corresponding to the current crankshaft position. The desired cam position values may also be determined based on one or more of a crankshaft position, an engine load, and an engine speed.

At step 606, the desired cam position value is compared to an actual cam position signal to provide a cam position error value to, for example, a camphaser position adjustment module, such as camphaser position adjustment module 84 of FIG. 5. At step 608, the camphaser position adjustment module generates a camphaser phase adjustment position signal based on the cam position error value. At step 610, the camphaser phase adjustment position signal is sent to a camphaser to initiate a phase change.

Figure 7:
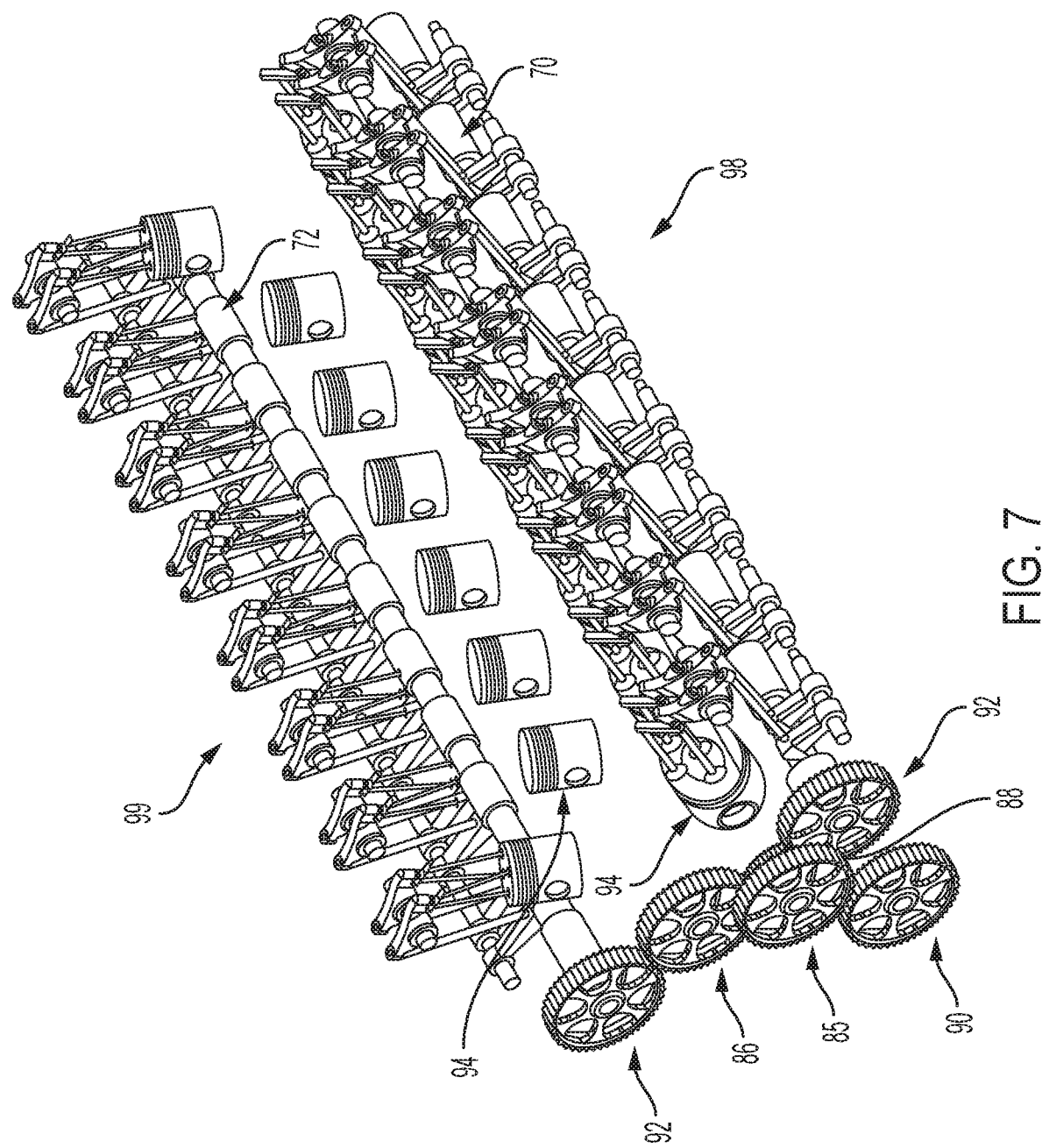
FIG. 7 is a 3D illustration of one illustrative embodiment of a spark-ignited engine system having a camphaser.

Referring to FIG. 7, the spark-ignited gas engine 40 with dual camshafts with camshaft gears 92 is shown in its V-configuration. Each bank (e.g., bank 1 98, bank 2 99) of the V-configuration comprises a camshaft, such as camshaft with camshaft gear 92, including one or more cams of lobes, such as cam 70 and 72 in FIG. 4. The cams 70, 72 may be arranged to engage the plurality of intake valves and the exhaust valve for the plurality of cylinders at each bank 98, 99 at various times within the cycle of spark-ignited gas engine 40. The spark-ignited gas engine 40 may also include one or more pistons 94. The camshaft gears of the camshafts with camshaft gear 92 may be either operatively or directly coupled to the camshaft to engage with a compound gear 85 associated with a camphaser 88. There may be an idler gear that engages with both an associated camshaft gear and an associated compound gear. For instance, the associated camshaft gear of dedicated camshaft 92 of bank 2 99 in FIG. 7 is engaged with an idler gear 86, which in turn is engaged with the compound gear 85 associated with the camphaser 88. Because the associated compound gear 85 is directly coupled to the camphaser 88, the camphaser 88, via the associated compound gear 85, is operable to adjust the rotational phase of the camshaft with camshaft gear 92 of bank 2 99. The associated camshaft gear 92 of dedicated camshaft with camshaft gear 92 of bank 1 98 is engaged with the compound gear 85 associated with the camphaser 88. The compound gear 85 associated with the camphaser 88 is directly engaged with a crankshaft gear associated with a crankshaft 90. In one example, a rotation of crankshaft gear 90 results in a rotation of both the camshaft gear 92 of bank 2 99 and camshaft gear 92 of bank 1 98. In another embodiment, the compound gear 85 associated with the camphaser 88 may indirectly be engaged with the crankshaft gear associated with the crankshaft 90 via an engaged idler gear. The gear assembly comprising the gears above do not require any timing belts, although the configuration of the gears may be adapted to include timing belts.

Figure 8:
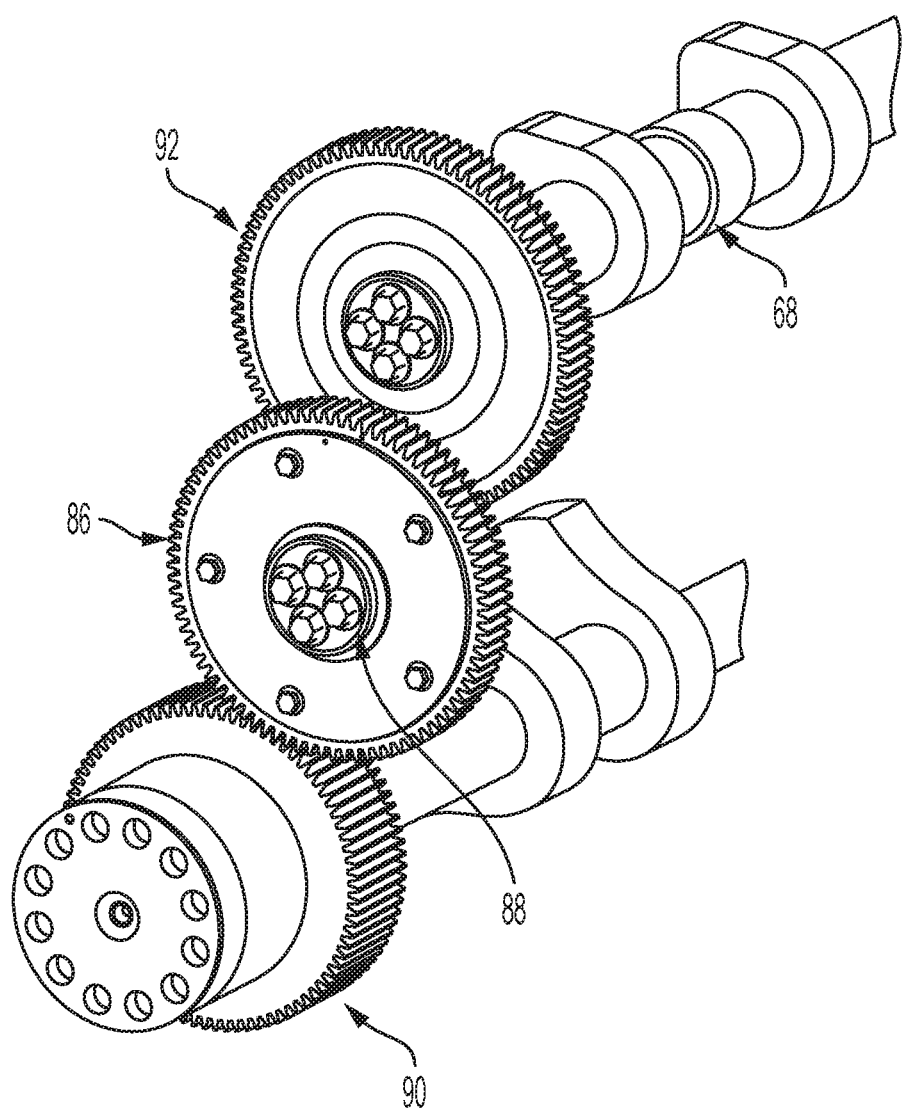
FIG. 8 is a block diagram of one illustrative embodiment of a gear assembly as the one illustrated in FIG. 7.

Referring to FIG. 8, a gear assembly is illustrated where a crankshaft gear 90 engages an idler gear 86. The idler gear 86 also engages a camshaft gear 92 associated with a camshaft 68. In the illustrated embodiment, the idler gear 86 includes a smaller compound inner gear (not shown) which directly engages with the camshaft gear 92. As such, the camshaft gear 92 would rotate at a faster rate than the crankshaft gear 90. In this embodiment, the camphaser 88 may be mounted to the smaller compound inner gear of the idler gear 86, or to the camshaft gear 92. In one example, the idler gear 86 engages directly (i.e., without a smaller compound inner gear) to the camshaft gear 92, such as when the crankshaft gear 90 is larger than the camshaft gear 92. In this example the camphaser 88 may be mounted to the camshaft 68 and may change the phase between the camshaft gear 92 and the camshaft 68.

Figure 9:
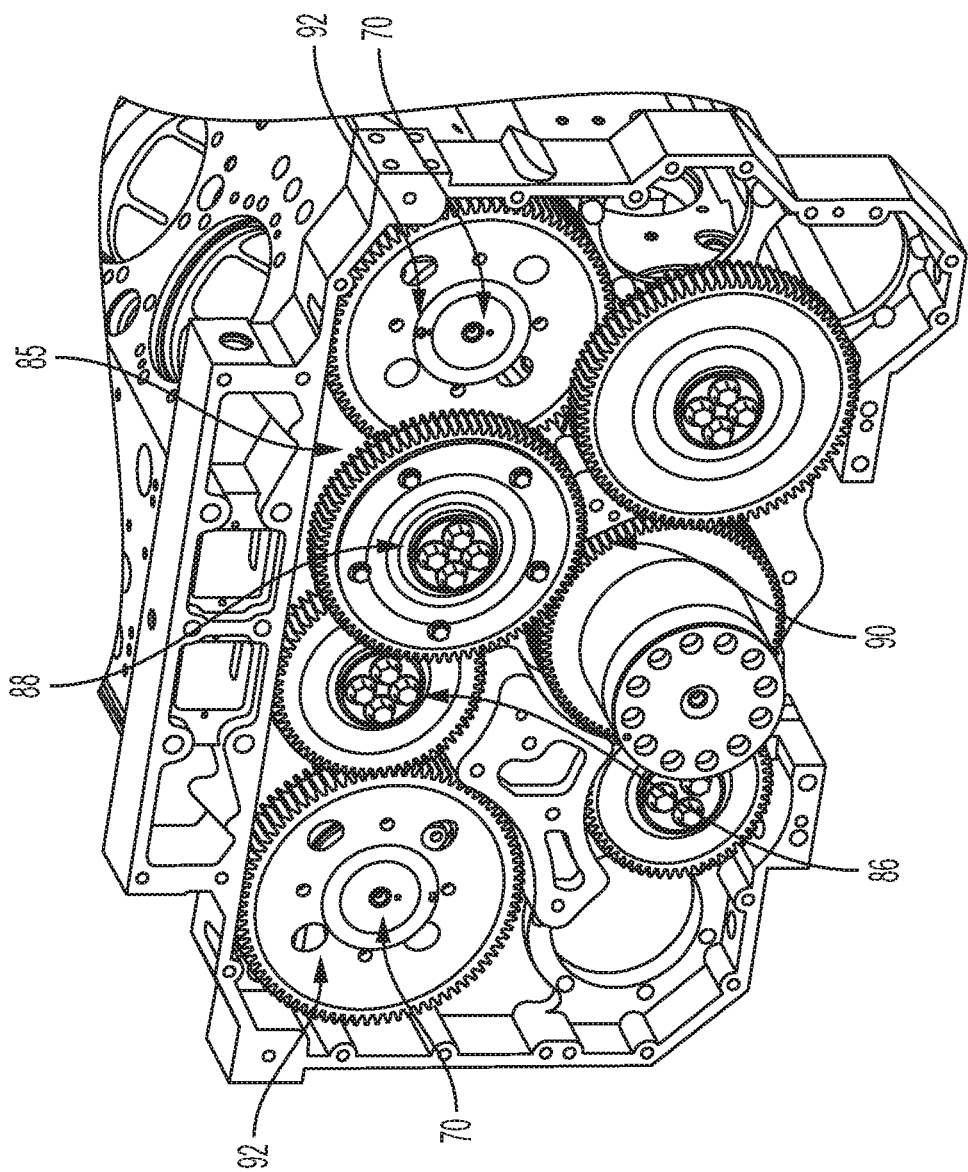
FIG. 9 is a 3D illustration of one illustrative embodiment of a gear assembly having dual camshafts and camphaser with an associated compound gear.
Figure 10:
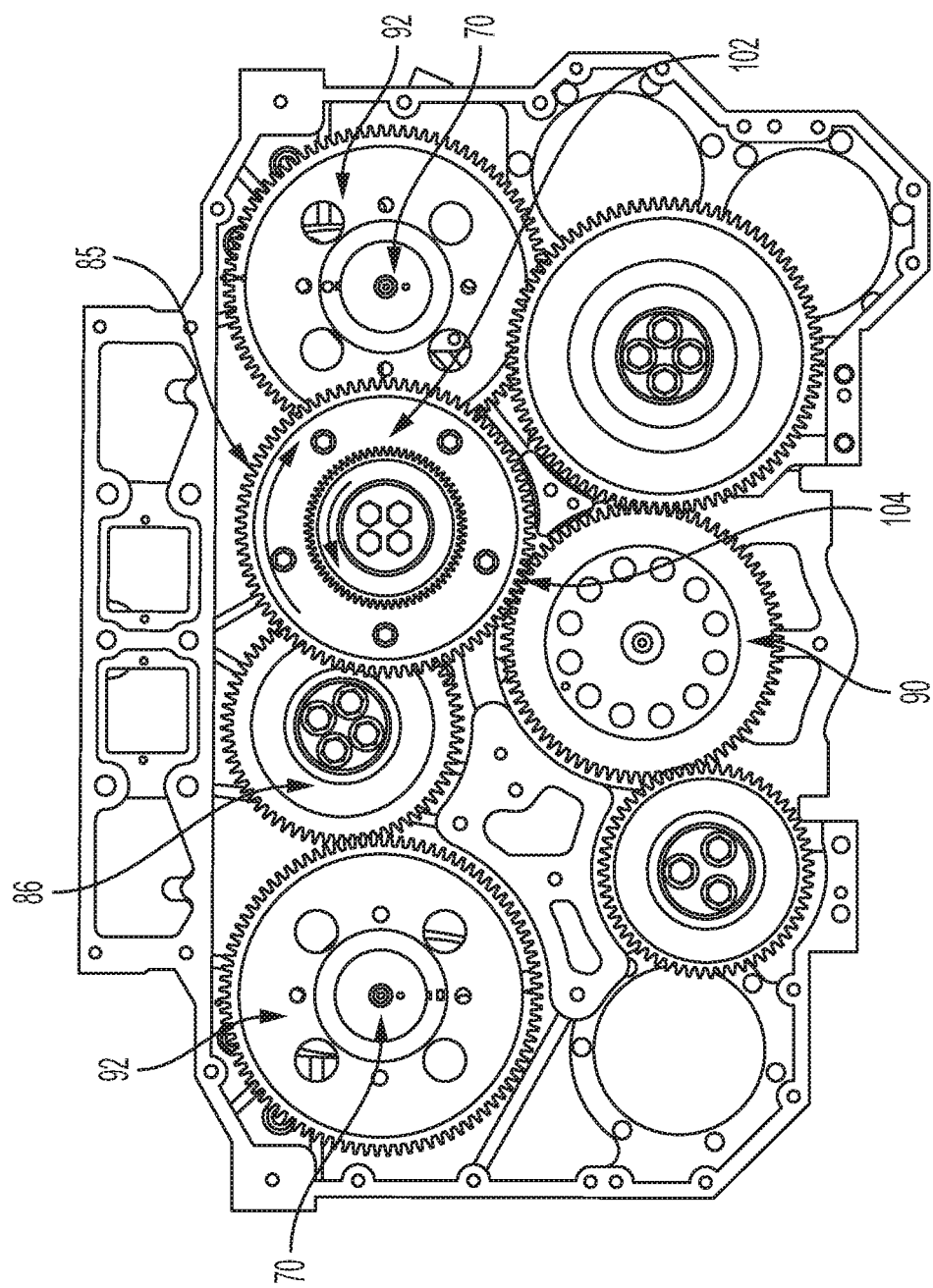
FIG. 10 is a 3D illustration of one illustrative embodiment of the gear assembly of FIG. 9 showing further details of the compound gear.
Figure 11:
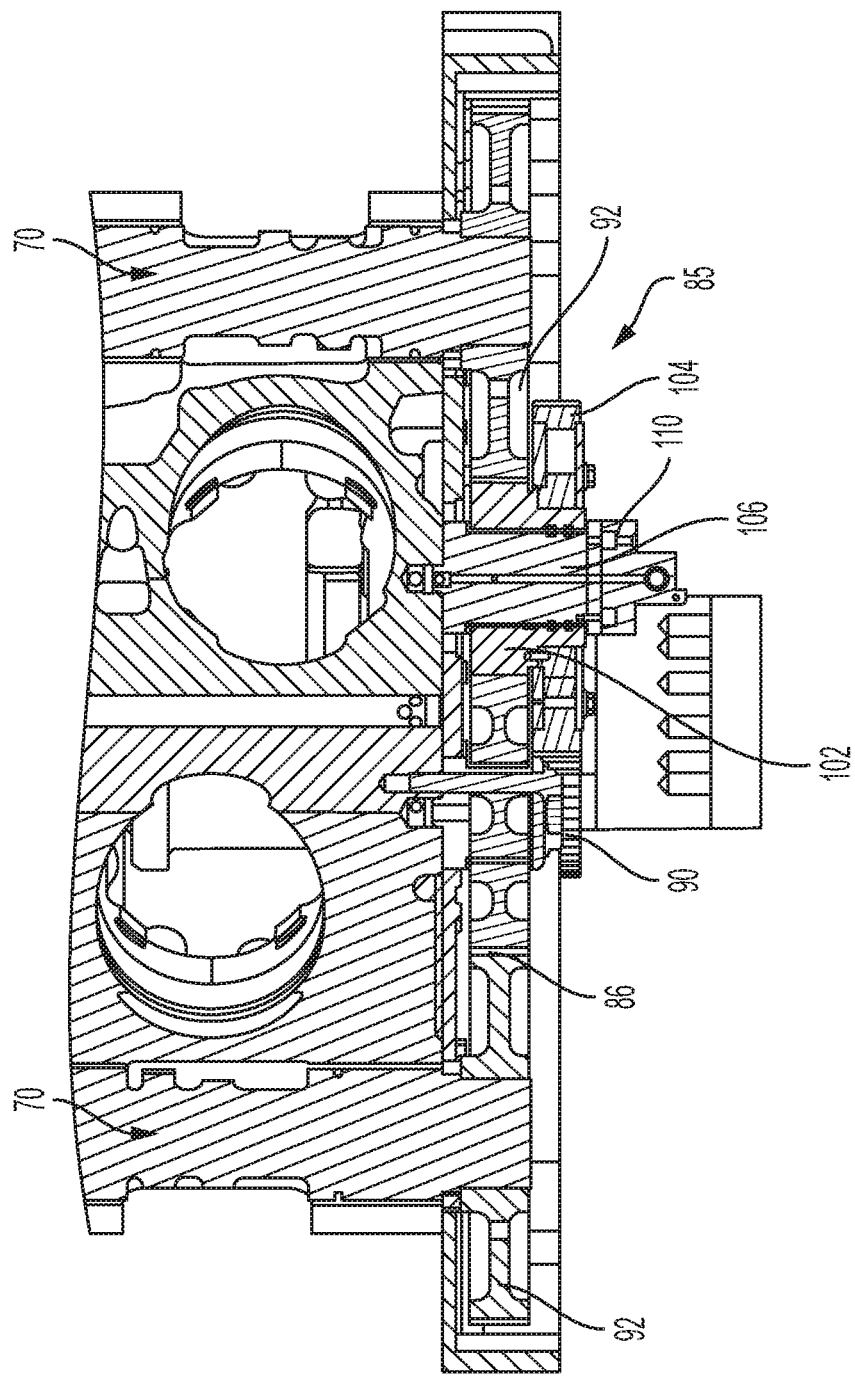
FIG. 11 is a 3D illustration of one illustrative embodiment of the gear assembly of FIG. 10 from a top view.

FIG. 9 illustrates an embodiment of a gear assembly having dual camshaft gears 92 where each is associated with a camshaft, and a compound gear 85 associated with a camphaser 88. In this example, compound gear 85 directly engages with crankshaft gear 90. Compound gear 85 also directly engages with the camshaft gear 92 of a left bank, and idler gear 86, via an inner gear, as shown in FIGS. 10 and 11. Idler gear 86 also directly engages with the camshaft gear 92 of a right bank. As such, compound gear 85 is directly engaged with the camshaft gear 92 of the left bank, and indirectly engaged with the camshaft gear 92 of the right bank. For example, when crankshaft gear 90 rotates, compound gear 85 rotates, thus causing both the camshaft gear 92 of the left bank and the camshaft gear 92 of the right bank to rotate simultaneously.

Compound gear 85 may also be associated with camphaser 88, where a controller, such as the controller 46 of FIG. 5, may be configured to adjust the camphaser 88. For example, by adjusting the camphaser 88, a cam angle operation of an intake valve and an exhaust valve of the camshafts associated with the camshaft gear 92 of the left bank and the camshaft gear 92 of the right bank may be adjusted simultaneously to a desired phase position to meet a target rotational phase of the camshafts.

FIG. 10 illustrates further details of the compound gear 85 of FIG. 9. Compound gear 85 includes both an inner gear 102, and an outer gear 104. As illustrated, outer gear 104 directly engages crank gear 90. Inner gear 102 directly engages idler gear 86 and camshaft gear 92 of a right bank. Idler gear 102 directly engages camshaft gear 92 of a left bank. Compound gear 85 may also include a camphaser 88, which may adjust the angular position of the inner gear 102 of compound gear 85 relative to the outer gear 104 of compound gear 85. In turn, the angular positions of both camshaft gear 92 of the left bank and camshaft gear 92 of the right are changed simultaneously relative to the crank gear 90. Thus, a cam angle operation of an intake valve and an exhaust valve of the camshafts associated with the camshaft gear 92 of the left bank and the camshaft gear 92 of the right bank may be adjusted simultaneously.

FIG. 11 illustrates a top view of the gear assembly of FIG. 10. As indicated, compound gear 85 includes inner gear 102 and outer gear 104 each coupled to gear hub 106. Camshaft gear 92 of the right bank directly engages with idler gear 86, and idler gear 86 also directly engages with inner gear 102 of compound gear 85. Inner gear 102 of compound gear 85 also directly engages with camshaft gear 92 of the left bank.

By applying cam phasing, the volumetric efficiency of the engine varies depending on the engine needs. Thus, during a transient response of the engine, the cam phasing may be at the retarded position causing the engine's volumetric efficiency to increase. By increasing the engine's volumetric efficiency, the energy directed towards the turbocharger will increase. The additional energy will help the turbocharger speed up at a faster rate and help the engine respond more quickly during the transient regime.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A spark-ignited gas engine system comprising:
   a plurality of cylinder banks, each including at least one cylinder;
   a plurality of camshafts, each coupled to a respective one of the plurality of cylinder banks and comprising at least one cam, the plurality of camshafts being driven by a crankshaft via a crankshaft gear connected to the crankshaft;
   a camphaser, the camphaser associated with a compound gear that includes an inner gear and an outer gear, wherein the outer gear of the compound gear couples the camphaser to the crankshaft and the inner gear of the compound gear couples the camphaser to the plurality of camshafts; and
   a controller including a memory having instructions stored therein that are executable by the controller to simultaneously adjust a cam angle operation of an intake valve and an exhaust valve of the at least one cylinder in each of the plurality of cylinder banks coupled to each of the plurality of camshafts by adjusting the camphaser to a desired phase position to meet a target rotational phase of the plurality of camshafts.

2. The system of claim 1 wherein the instructions stored in the memory further include instructions that are executable by the controller to adjust the camphaser based on at least one of an actual crankshaft position, an actual cam position, an actual engine load, and an actual engine speed.

3. The system of claim 2, wherein the memory has stored therein a look up table that tabulates at least one of a crankshaft position and an engine load against a desired cam position value, wherein the instructions stored in the memory include instructions that are executable by the controller to:
   compare the actual cam position with the desired cam position value; and
   adjust the camphaser to the desired phase position based on the comparison of the actual cam position with the desired can position value.

4. The system of claim 1, wherein the crankshaft gear is indirectly engaged with the camphaser via an idler gear that is directly engaged with both the crankshaft gear and the outer gear of the compound gear, and wherein the inner gear of the compound gear is directly engaged with a camshaft gear associated with a camshaft of the plurality of camshafts.

5. The system of claim 1, wherein the crankshaft gear is directly engaged with the camphaser via the outer gear of the compound gear.

6. The system of claim 5, wherein the inner gear of the compound gear is directly engaged with a camshaft gear associated with a camshaft of the plurality of camshafts.

7. The system of claim 5, wherein the inner gear of the compound gear is indirectly engaged with a camshaft gear associated with a camshaft of the plurality of camshafts via an idler gear that is directly engaged with both the camshaft gear and the inner gear of the compound gear.

8. A method of controlling a spark-ignited gas engine system, the method comprising:
   simultaneously adjusting a cam angle operation of an intake valve and an exhaust valve of at least one cylinder in each of a plurality of cylinder banks coupled to each of a plurality of camshafts by adjusting a camphaser to a desired phase position to meet a target rotational phase of the plurality of camshafts, wherein the camphaser is associated with a compound gear that includes an inner gear and an outer gear, wherein the outer gear of the compound gear couples the camphaser to a crankshaft and the inner gear of the compound gear couples the camphaser to the plurality of camshafts.

9. The method of claim 8, wherein adjusting the camphaser is based on at least one of an actual crankshaft position, an actual cam position, an actual engine load, and an actual engine speed.

10. The method of claim 9, further comprising:
comparing the actual cam position with a desired cam position value; and
adjusting the camphaser to the desired phase position based on the comparing.

11. The method of claim 8, wherein a crankshaft gear associated with the crankshaft is indirectly engaged with the camphaser via an idler gear that is directly engaged with both the crankshaft gear and the outer gear of the compound gear, and wherein the inner gear of the compound gear is directly engaged with a camshaft gear associated with a camshaft of the plurality of camshafts.

12. The method of claim 8, wherein a crankshaft gear associated with the crankshaft is directly engaged with the camphaser via the outer gear of the compound gear.

13. The method of claim 12, wherein the inner gear of the compound gear is directly engaged with a camshaft gear associated with a camshaft of the plurality of camshafts.

14. The method of claim 12, wherein the inner gear of the compound gear is indirectly engaged with a camshaft gear associated with a camshaft of the plurality of camshafts via an idler gear that is directly engaged with both the camshaft gear and the inner gear of the compound gear.

* * * * *